US007721211B1

(12) United States Patent
Yehuda et al.

(10) Patent No.: US 7,721,211 B1
(45) Date of Patent: May 18, 2010

(54) METHODS AND APPARATUS PROVIDING FILTERING IN A MANAGEMENT APPLICATION

(75) Inventors: Hanna Yehuda, Newton, MA (US); Alan R. Schell, Hopkinton, MA (US); Michaell A. Galvin, Foxboro, MA (US); James Bernard McElroy, Jr., Brookline, NH (US); Charles Dao, Concord, MA (US)

(73) Assignee: EMC Corporation, Hopkinton, MA (US)

( * ) Notice: Subject to any disclaimer, the term of this patent is extended or adjusted under 35 U.S.C. 154(b) by 922 days.

(21) Appl. No.: 11/233,810

(22) Filed: Sep. 23, 2005

(51) Int. Cl.
*G06F 15/177* (2006.01)
(52) U.S. Cl. .................. 715/734; 715/733; 715/736; 715/738
(58) Field of Classification Search ............ 715/733, 715/734, 736, 738, 739, 741, 744, 781, 810
See application file for complete search history.

(56) References Cited

U.S. PATENT DOCUMENTS

| 2004/0075680 | A1* | 4/2004 | Grace et al. | 345/734 |
| 2004/0085367 | A1* | 5/2004 | Hagarty, Jr. | 345/854 |
| 2006/0059428 | A1* | 3/2006 | Humphries et al. | 715/734 |
| 2006/0271677 | A1* | 11/2006 | Mercier | 709/224 |
| 2007/0288861 | A1* | 12/2007 | Tabellion et al. | 715/783 |

* cited by examiner

Primary Examiner—Adam L Basehoar
Assistant Examiner—Rashawn Tillery
(74) Attorney, Agent, or Firm—Chapin IP Law, LLC

(57) ABSTRACT

A system filters network management information in a graphical user interface by receiving a managed object selection that represents a resource in a storage area network. The system then identifies a view selection associated with the managed object selection, and produces a filter region containing filter components. At least one of the filter components is contingent upon the managed object selection in conjunction with the view selection. The system then displays the filter region containing the filter components.

19 Claims, 9 Drawing Sheets

```
┌─────────────────────────────────────────────────────────────────────┐
│ 224 IDENTIFY PARAMETER VALUES FROM A USER THAT SPECIFIES AT LEAST   │
│ ONE FILTER COMPONENT IN THE FILTER REGION                           │
│                                                                     │
│   ┌─────────────────────────────────────────────────────────────┐   │
│   │  ┌───────────────────────────────────────────────────────┐  │   │
│   │  │ 225 IDENTIFY AN EXPANDED DATA ICON FOR USE IN         │  │   │
│   │  │ CONJUNCTION WITH A DATA FIELD                         │  │   │
│   │  └───────────────────────────────────────────────────────┘  │   │
│   │                          │                                  │   │
│   │                          ▼                                  │   │
│   │  ┌───────────────────────────────────────────────────────┐  │   │
│   │  │ 226 ENABLE THE EXPANDED DATA ICON, INDICATING         │  │   │
│   │  │ INFORMATION CONTAINED WITH THE DATA FIELD HAS EXCEEDED│  │   │
│   │  │ A CHARACTER LIMIT, THE CHARACTER LIMIT REPRESENTING A │  │   │
│   │  │ TOTAL NUMBER OF CHARACTERS THE DATA FIELD CAN CONTAIN │  │   │
│   │  └───────────────────────────────────────────────────────┘  │   │
│   │                          │                                  │   │
│   │                          ▼                                  │   │
│   │  ┌───────────────────────────────────────────────────────┐  │   │
│   │  │ 227 RECEIVE A SELECTION OF THE EXPANDED DATA ICON FROM│  │   │
│   │  │ A USER                                                │  │   │
│   │  └───────────────────────────────────────────────────────┘  │   │
│   │                          │                                  │   │
│   │                          ▼                                  │   │
│   │  ┌───────────────────────────────────────────────────────┐  │   │
│   │  │ 228 EXPAND THE DATA FIELD TO MAKE VISIBLE TO A USER THE│ │   │
│   │  │ INFORMATION CONTAINED WITH THE DATA FIELD ASSOCIATED  │  │   │
│   │  │ WITH THE EXPANDED DATA ICON                           │  │   │
│   │  └───────────────────────────────────────────────────────┘  │   │
│   └─────────────────────────────────────────────────────────────┘   │
│                                  OR                                 │
│   ┌─────────────────────────────────────────────────────────────┐   │
│   │  ┌───────────────────────────────────────────────────────┐  │   │
│   │  │ 229 RECEIVE A PARAMETER VALUE VIA A MOUSE             │  │   │
│   │  └───────────────────────────────────────────────────────┘  │   │
│   │                          │                                  │   │
│   │                          ▼                                  │   │
│   │  ┌───────────────────────────────────────────────────────┐  │   │
│   │  │ 230 RECEIVE A PARAMETER VALUE VIA A KEYBOARD          │  │   │
│   │  └───────────────────────────────────────────────────────┘  │   │
│   └─────────────────────────────────────────────────────────────┘   │
└─────────────────────────────────────────────────────────────────────┘
```

*FIG. 9*

METHODS AND APPARATUS PROVIDING FILTERING IN A MANAGEMENT APPLICATION

BACKGROUND

Conventional computer networks allow a network manager or operator to add or modify new or existing network elements such as switches, routers, hubs, servers, disks, and other devices. As an example, in a conventional storage area network (SAN), one or more storage arrays having very large amounts of data storage capacity are connected through connectivity devices, such as switches, to host computer systems that operate as servers of data to client computer systems that request the data from the storage arrays. Thus, the storage area network is a network that interconnects host, connectivity and storage elements in a storage environment, and ensures fault-free and timely access to the data for client users via the host servers. In the storage area network, a conventional storage area network management application is employed to monitor and control (i.e., to manage) the host, connectivity and storage elements in the network. Management of the storage area network by the network management application allows optimal usage and throughput in the storage area network by identifying areas of contention, reporting malfunctions, providing access control, and allocating ports and data flow paths between the host and storage devices in the storage area network.

Certain conventional storage area network management applications include Graphical User Interface (GUI) software programs that enable network managers to graphically manage, control and configure various types of hardware and software resources or managed entities associated with a corresponding managed network. In one conventional storage area network management application, rendering the graphical user interface enables the network manager to graphically select, interact with, and manage local or remote devices and associated software processes operating in the network. More specifically, based on use of the graphical user interface in combination with an input device such as a hand operated keyboard and/or mouse and corresponding pointer displayed on a viewing screen, a network manager is able to manage hardware and software entities such as storage devices, peripherals, network data communications devices, and so forth associated with the network. Typically, in such network management applications, a network manager may select a displayed icon representing a corresponding resource in the storage area network and apply a management command in order to display corresponding management information.

SUMMARY

Conventional technologies for graphical user interface-based storage area network management applications suffer from a variety of deficiencies. In particular, conventional technologies for graphical user interface-based storage area network management applications are limited in that they do not provide customized filter components based on the combination of a chosen managed object selection and a chosen view. That is, in operation of conventional storage area network management applications, the user is not presented with different filtering options based upon the type of resources that the user wants to manage in combination with the view that the user desires to see concerning those managed resources. Filtering is important because in a typical storage area network, there may be many hundreds or thousands of a particular managed resource, such as a disk device. Filtering allows the user to select and/or view information concerning only a subset of the total number of such devices. However, in conventional management applications, filtering of resources being viewed on the graphical user interface is limited to using simple conventional filter mechanisms such as providing wildcard characters (e.g. "*") to designate any string of characters that make up the name of a resource. Thus, using conventional filtering techniques, if a SAN had hosts named "BostonA1", "Boston A2", "BostonA3" . . . "BostonAN", "BostonB1", "BostonB2" and so forth, if a user wanted to see all hosts in the SAN that begin only with the characters "BostonA", but not "BostonB", the user could enter "BostonA*" into a filter field and the application would filter the host names accordingly. However, conventional applications do not present different filtering options based on different types of resources selected by the user for management and based upon a specific view by which those resources (or management data concerning those resources) are to be rendered on the graphical user interface.

In contrast, embodiments of the invention disclosed herein significantly overcome such deficiencies and provide a system that includes a computer system executing a network management filtering process within a graphical user interface. The network management filtering process receives a managed object selection that represents a resource(s) in a storage area network (SAN). In one example configuration, the managed object selection is a default selection. In another example configuration, a user selects the managed object selection. The managed object selection may be, for example, a selection of one or more hosts, storage systems, network connectivity devices, SAN fabrics, or the like. The network management filtering process also identifies a view selection associated with the managed object selection, and produces a filter region containing filter components. In one example configuration, the view selection is a default view selection. In another example configuration, a user chooses a view selection. The view selection indicates to the management application what type of view (i.e. what specific information) that user desires to see concerning the selected managed object selection. In embodiments explained herein, at least one of the filter components is contingent upon the managed object selection in conjunction with the view selection. That is, the combination of the managed object selected, and the selected view selection (either a default selection or chosen by a user) determine which filter components are displayed. The network management filtering process then displays a filter region with the associated filter components as determined by object and view selection. In this manner, filter components specifically related, for example, to the view or to the managed object type or to both can be displayed thus giving the user the ability to provide much more customized filtering of managed resources. As a brief example, if the user selects a "Hosts" managed object selection (i.e. a folder representing all hosts operating in the SAN), and the user selects (or a default setting selects) a "Properties" view to see various properties of those hosts, the filter region of the graphical user interface produced in accordance with embodiments disclosed herein can include customized filter components such as data fields, pull down menus, date range input fields and the like allowing a user to provide filter settings specifically relating to host properties, such as operating system types, host names, locations within the SAN, and so forth. In this manner, the system disclosed herein uses the combination of the resource type and view type to determine what specific filter components are shown to the user.

In example configurations, the filter components can be a drop down menu, data field, checkboxes, radio buttons, help button, clear button, filter button, or an expanded data icon indicating a data field has more data than is visible to a user. Note that this list is not exhausted. Note that some of these components may not be contingent on the user's resource selection and view but rather, may be permanent fixtures in the filter region, or may be visible but not active. As an example, in one configuration, the filter, reset, clear, help, expanded data icons are permanent. For example, if a data field can contain a limit of fifty characters, and a user inputs one hundred characters, only fifty of the one hundred characters will be displayed within the data field. An expanded data icon will be enabled indicating that the data field contains more characters than is visible within the data field, to alert a user that the data field contains more data than is presently visible. By selecting the expanded data icon, the user is presented with a list of those characters that have been inputted into the data field. A filter component such as a reset button resets all of the values of all filter components.

The network management filtering process identifies parameter values of at least one of the filter components in the filter region. The parameter values identify, for example, the constraints by which the managed object selections are to be filtered. In one example configuration, the parameter value is a default parameter value. In another example configuration, the parameter value is a parameter value selection supplied by a user. A parameter value supplied by a user can be supplied, for example, by a mouse, or entered into a filter component field via a keyboard. A user supplying a parameter value via a keyboard can enter a selection representing more than one possible selection. For example, a user can employ the use of 'wildcards', meaning an entry of "losan*" indicates filtering the managed object selections to display only those managed object selections that are labeled as 'losan' with zero or more characters following the 'losan' label. For example, managed object selections labeled as 'losan', 'losan1', 'losanz', etc would all be displayed if a user chose to filter the managed object selections to only display those matching 'losan*'.

The network management filtering process applies the parameter values to managed object data associated with the managed object selection to produced filtered results, and displays the filtered results in a results region of the graphical user interface. In other words, parameter values of the filter components are identified, and those parameter values are applied to data associated with the managed object selection to filter the managed object selections to display only those managed object selections that match the parameter values chosen for the filter components. The filtered results (including filtered managed object data) are displayed in a results region of the graphical user interface.

The network management filtering process receives at least one selection identifying managed object data associated with the managed object selection. In one example configuration, a user can select more than one managed object data on which to perform an action, such as a filtering action. When the user clicks a filter button, the network management filtering process performs the filtering action, and updates a filter station region containing a filter status, and a filter metric that reflects the filtered results produces as a result of performing the action on the managed object data.

During an example operation of one embodiment, suppose a user, for example, a storage area network administrator, needs to view all the task lists assigned to a user, for example, a user named "Mary Steingart". The storage area network administrator selects a managed object selection, for example, "Hosts", from the graphical user interface. By choosing "Hosts" as the managed object selection, the network management filtering process identifies a view selection associated with the managed object selection, "Hosts". In this example, the available view selections are "Properties", "Masking", "Topology", "Path Details", "Task Lists", "Schedule", and "Alerts". The storage area network administrator then chooses a view selection, in this example, "Task Lists", from the available view selections. The network management filtering process produces a filter region containing filter components, such as "State", "Type", "Filter on Host(s)", "Task List(s)", "Assigned To", and "Last Modified: From and To". The user then selects a user (e.g., "Mary Steingart") from the list of users available in the drop down menu for the filter component titled "Assigned To". By changing a filter component, the filter button is enabled. The storage area network administrator can now select the filter button to produce filtered results within the results region. Within the filter region status window, the filter status changes from "Unfiltered" to "Filtered", and the filter metric displays "3 of 19 Tasks on 500 Hosts". The filter metric identifies nineteen tasks associated with five hundred Hosts. Of those nineteen tasks, three are assigned to user "Mary Steingart".

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features disclosed herein may be employed in data communications devices and other computerized devices and software systems for such devices such as those manufactured by EMC, Inc., of Hopkinton, Mass.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 9 illustrates a flowchart of a procedure performed by the system of FIG. 1 when the network management filtering process identifies parameter values from a user that specifies at least one filter component in the filter region, according to one embodiment disclosed herein.

DETAILED DESCRIPTION

Figure 1:
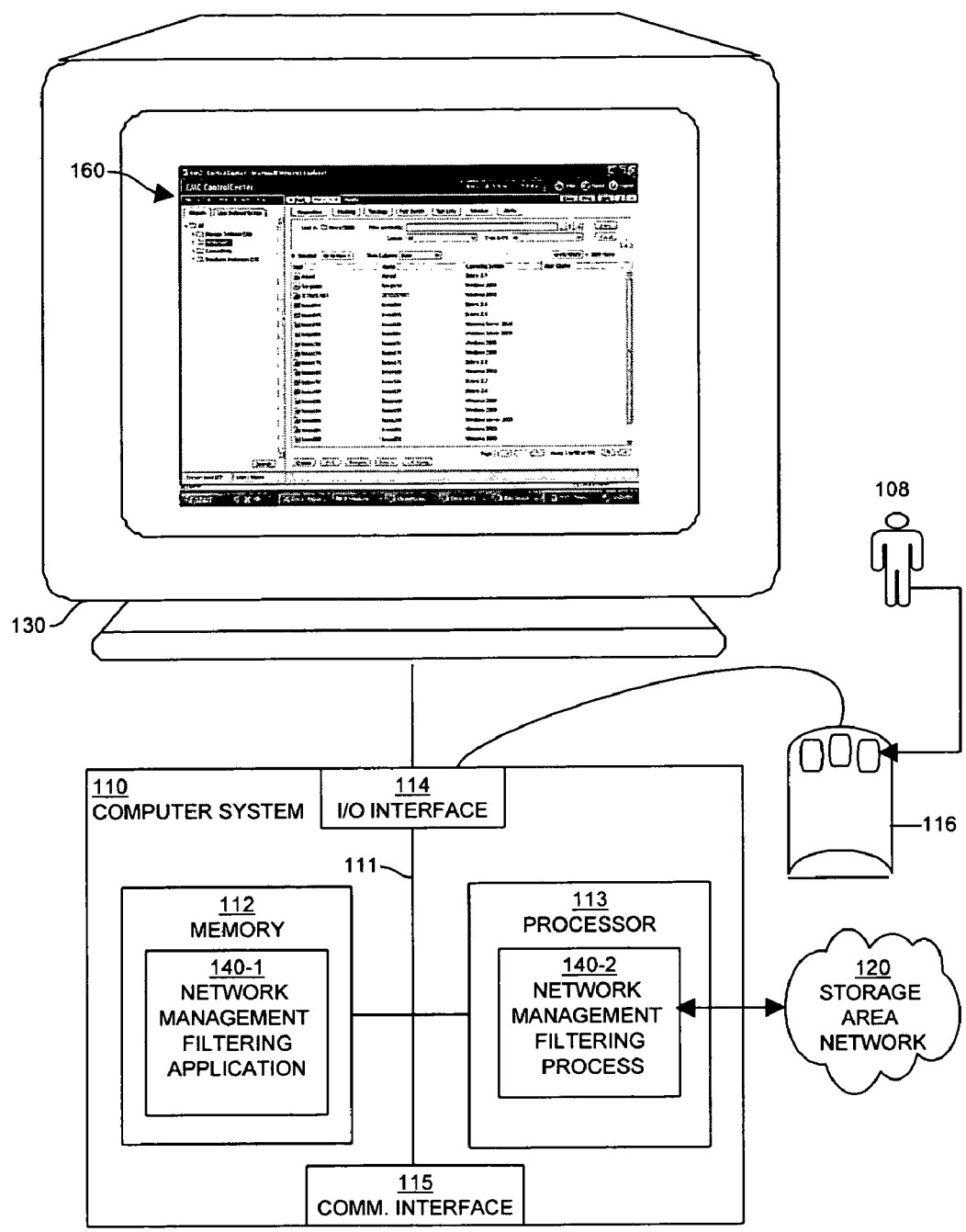
FIG. 1 shows a high-level block diagram of a computer system according to one embodiment disclosed herein.

Embodiments disclosed herein include methods and a computer system that perform a filtering process within a graphical user interface that displays and allows user selection of filter data values (i.e. filter component parameter values) based on specific resource and view selections. It can be used within a network management application, for example, but is not limited to such use. In example embodiments explained herein, the filtering process is referred to as a network management filtering process as it is used in network management system in example embodiments. If the view and/or resource type selections change, different filter components can be added or removed from the filter region. Thus the customized filtering provided by this system allows a user to filter SAN management information presented to the user at a finer level of granularity as compared with conventional filtering techniques. In SAN management, this is important since the amount of information a user can view concerning SAN resources can be quickly overwhelming. In operation, the network management filtering process receives a managed object selection that represents a resource in a storage area network (SAN). The resource might be an icon representing one or more hosts, SAN switches, or data storage systems, for example. The network management filtering process identifies a view selection associated with the managed object selection, and produces a filter region containing filter components. The view selection can be a default setting, or the user can chose a specific view, such as a properties view, a task view, a topology view and so forth. The view indicates what details the user wishes to see for the selected resource type (e.g. host, switch, data storage system). In the filter of the graphical user interface, at least one of the filter components is displayed and is contingent (i.e., is displayed or not) upon the managed object selection in conjunction with the view selection. That is, the combination of the managed object selected, and the selected view selection (either a default selection or chosen by a user) determine which filter components are displayed. The network management filtering process then displays the filter region with the associated filter components.

The network management filtering process identifies parameter values of at least one of the filter components in the filter region. The parameter values identify, for example, the constraints by which the managed object selections are to be filtered. The network management filtering process applies the parameter values to managed object data associated with the managed object selection to produced filtered results, and displays the filtered results in a results region of the graphical user interface. In other words, parameter values of the filter components are identified, and those parameter values are applied to data associated with the managed object selection to filter the managed object selections to display only those managed object selections that match the parameter values chosen for the filter components. The filtered results (including filtered managed object data) are displayed in a results region of the graphical user interface.

The network management filtering process receives at least one selection identifying managed object data associated with the managed object selection. When a user clicks a filter button, the network management filtering process performs the filtering action, and updates a filter station region containing a filter status and a filter metric that reflects the filtered results produces as a result of performing the action on the managed object data.

FIG. 1 is a block diagram illustrating example architecture of a computer system 110 that executes, runs, interprets, operates or otherwise performs an network management filtering application 140-1 and network management filtering process 140-2 suitable for use in explaining example configurations disclosed herein. The computer system 110 may be any type of computerized device such as a personal computer, workstation, portable computing device, console, laptop, network terminal or the like. An input device 116 (e.g., one or more user/developer controlled devices such as a keyboard, mouse, etc.) couples to processor 113 through I/O interface 114, and enables a user 108 to provide input commands, and generally control the graphical user interface 160 that the network management filtering application 140-1 and process 140-2 provides on the display 130. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers, switches, routers, hubs, servers, disks, other devices, etc.) on a storage area network 120.

The memory system 112 is any type of computer readable medium, and in this example, is encoded with a network management filtering application 140-1 as explained herein. The network management filtering application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the network management filtering application 140-1. Execution of the network management filtering application 140-1 in this manner produces processing functionality in a network management filtering process 140-2. In other words, the network management filtering process 140-2 represents one or more portions or runtime instances of the network management filtering application 140-1 (or the entire network management filtering application 140-1) performing or executing within or upon the processor 113 in the computerized device 110 at runtime.

It is noted that example configurations disclosed herein include the network management filtering application 140-1 (i.e., in the form of un-executed or non-performing logic instructions and/or data). The network management filtering application 140-1 may be stored on a computer readable medium (such as a floppy disk), hard disk, electronic, magnetic, optical, or other computer readable medium. The network management filtering application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the network management filtering application 140-1 in the processor 113 as the network management filtering process 140-2 including the managing application process 150. Those skilled in the art will understand that the computer system 110 may include other processes and/or software and hardware components, such as an operating system not shown in this example.

A display 130 need not be coupled directly to computer system 110. For example, the network management filtering application 140-1 can be executed on a remotely accessible computerized device via the network interface 115. In this instance the graphical user interface 160 may be displayed locally to a user 108 of the remote computer and execution of the processing herein may be client-server based.

Figure 2:
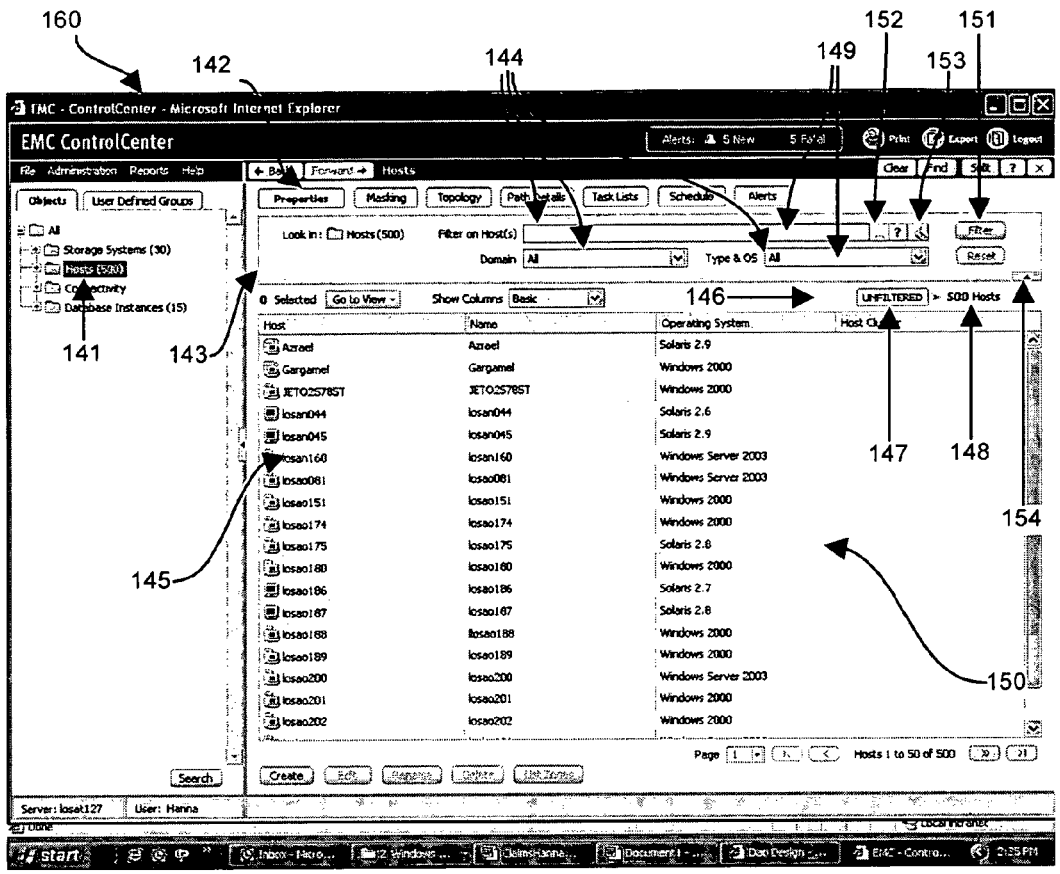
FIG. 2 shows an example screenshot of managed object data associated with a managed object selection, according to one embodiment disclosed herein.

FIG. 2 is a screenshot example of the graphical user interface 160 displaying unfiltered managed object data 145. The graphical user interface 160 contains a managed object selection 141, with its associated view selection 142, and filter region 143. The filter region 143 contains filter components 144 that receive parameter values 149. The filter region 143 also contains a filter button 151, a clear button 153, an expanded data icon 152, and a filter region window status 154. The filter status region 146, within the filter region 143, contains the filter status 147 and filter metric 148. By operating the filter button 151, managed object data 145 is displayed within the results region 150.

Figure 3:
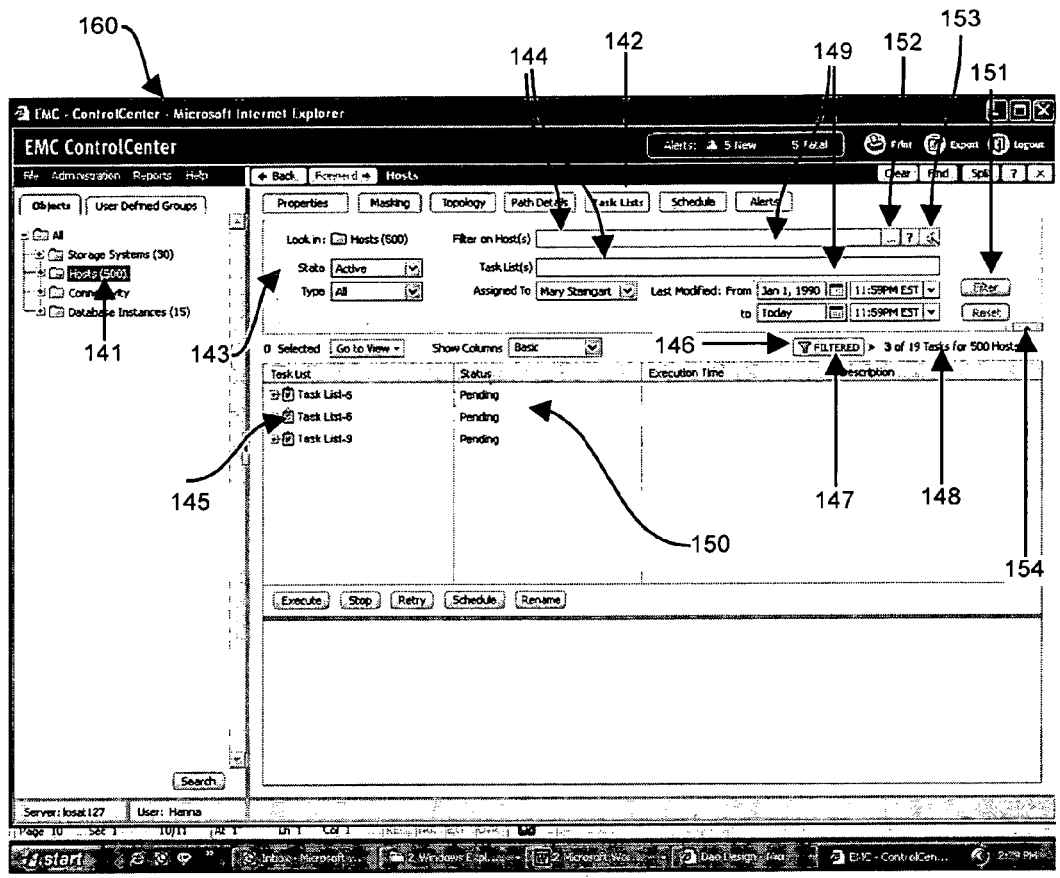
FIG. 3 shows an example screenshot of filtered results containing task lists associated with a managed object selection, according to one embodiment disclosed herein.

FIG. 3 is a screenshot example of the graphical user interface 160 displaying filtered results including task lists associated with a selected user. The graphical user interface 160 contains a managed object selection 141, with its associated view selection 142, and filter region 143. The filter region 143 contains filter components 144 that receive parameter values 149. The filter region 143 also contains a filter button 151, a clear button 153, an expanded data icon 152, and a filter region window status 154. The filter status region 146, within the filter region 143, contains the filter status 147 and filter metric 148. By operating the filter button 151, managed object data 145 is displayed within the results region 150.

Figure 4:
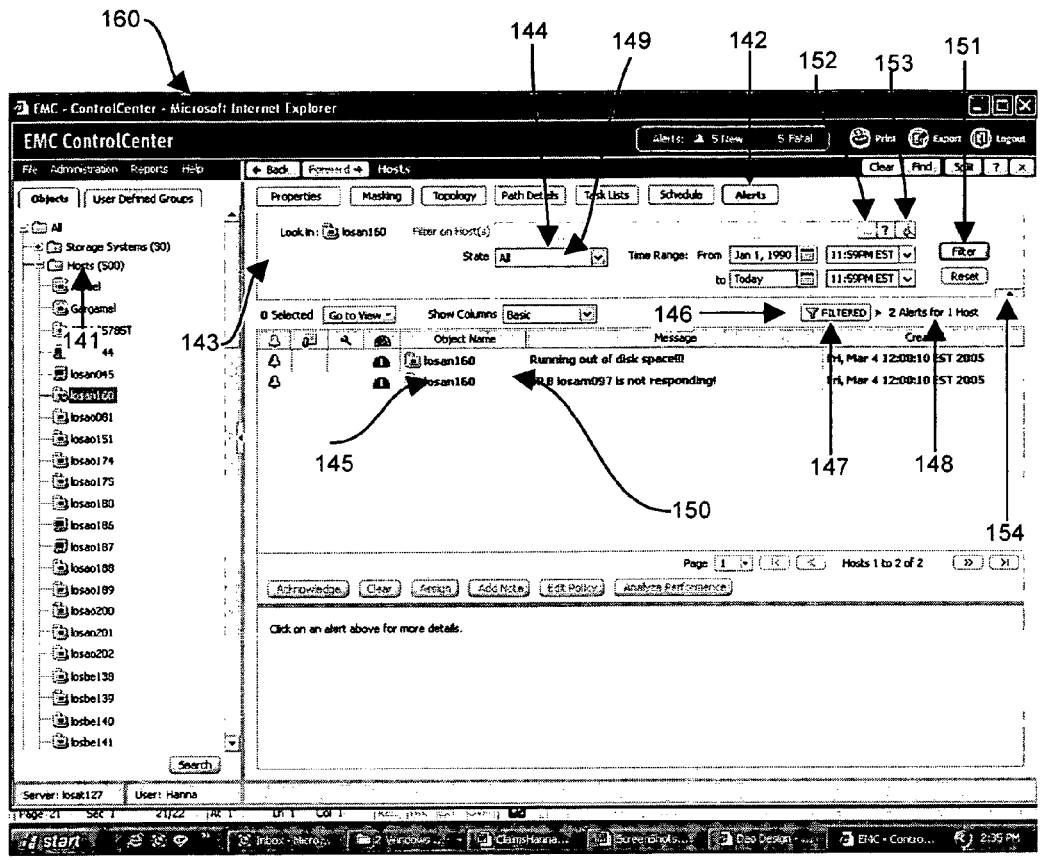
FIG. 4 shows an example screenshot of filtered results containing alerts associated with a managed object selection, according to one embodiment disclosed herein.

FIG. 4 is a screenshot example of the graphical user interface 160 displaying alerts associated with a managed object selection 141. The graphical user interface 160 contains a managed object selection 141, with its associated view selection 142, and filter region 143. The filter region 143 contains filter components 144 that receive parameter values 149. The filter region 143 also contains a filter button 151, a clear button 153, an expanded data icon 152, and a filter region window status 154. The filter status region 146, within the filter region 143, contains the filter status 147 and filter metric 148. By operating the filter button 151, managed object data 145 is displayed within the results region 150.

Further details of configurations explained herein will now be provided with respect to a flow chart of processing steps that show the high level operations disclosed herein to perform the network management filtering process' 140-2.

Figure 5:
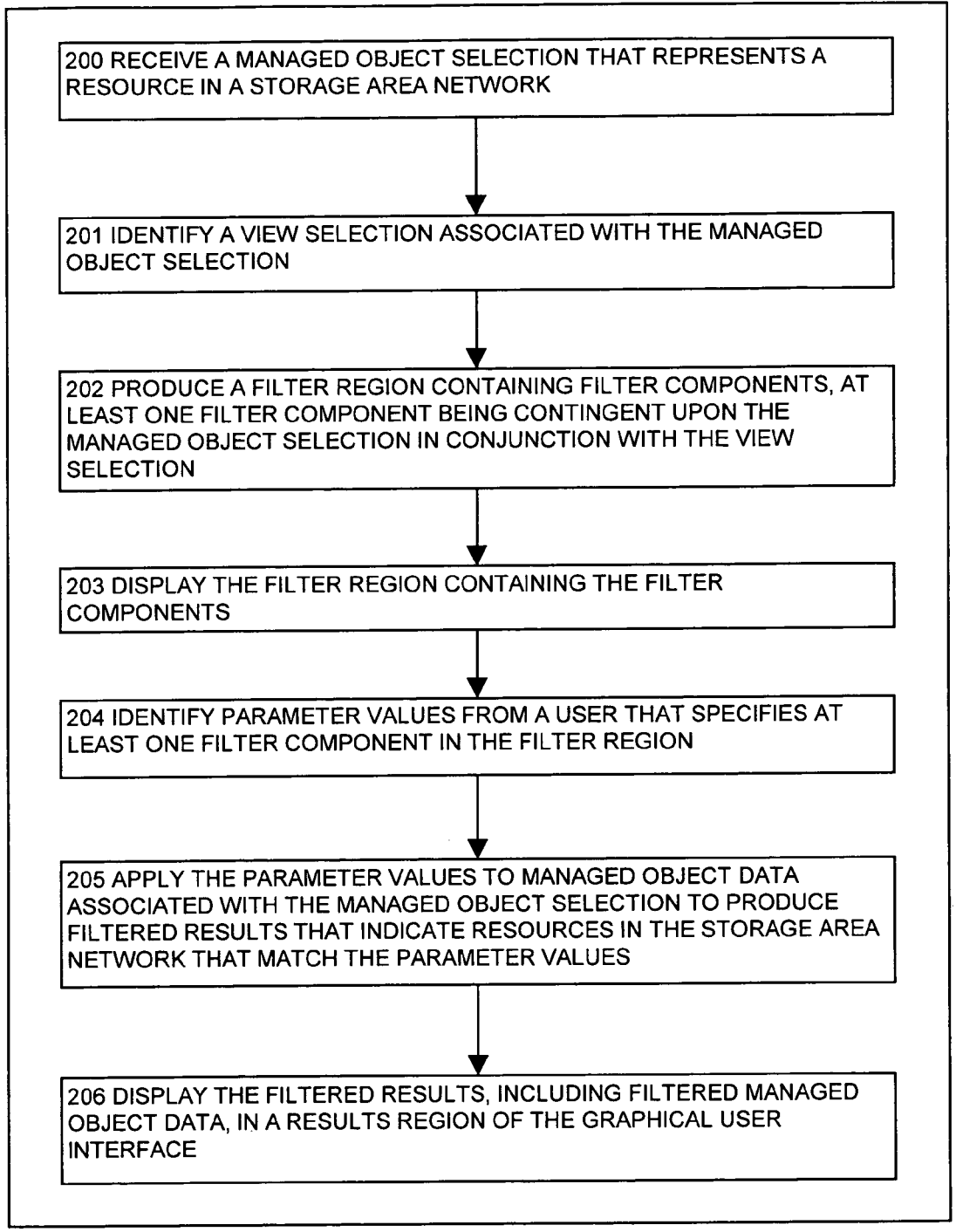
FIG. 5 illustrates a flowchart of a procedure performed by the system of FIG. 1 when the network management filtering process receives a managed object selection that represents a resource in a storage area network, according to one embodiment disclosed herein.

FIG. 5 is a flowchart of the steps performed by the network management filtering process 140-2 when it receives a managed object selection 141 that represents a resource in a storage area network 120, identifies a view selection 142, produces a filter region 143 associated with the view selection 142 and managed object selection 141, and then displays the filtered results in a results region 145.

In step 200, the network management filtering process 140-2 receives a managed object selection 141 that represents a resource in a storage area network 120. A user 108, such as a storage area network manager, selects a managed object selection 141 (such as storage systems, hosts, connectivity, database instances, etc) from the graphical user interface 160, to produce filtered results within the results region 145.

In step 201, the network management filtering process 140-2 identifies a view selection 142 associated with the managed object selection 141. The items in the view selection 142 are associated with the managed object selection 141, and can change depending on the chosen managed object selection 141. In an example configuration, the view selection 142 can include:

i) A properties view, that if selected as the view selection 142, identifies properties associated with the managed object selection 141.
  ii) A masking view, that if selected as the view selection 142, is associated with logical units (LUN) masking that limits access to the managed object selection 141.
  iii) A topology view that, if selected as the view selection 142, identifies a topology of a network 120 associated with the managed object selection 141.
  iv) A path view that, if selected as the view selection 142, identifies path details within the topology of the network 120 associated with the managed object selection 141
  v) A task lists view that, if selected as the view selection 142, identifies users 108 assigned to each task required of the managed object selection 141.
  vi) A schedule view, that if selected as the view selection 142, details scheduling actions to be performed on the managed object selection 141 within the network 120 associated with the managed object selection 141.
  vii) An alerts view, that if selected as the view selection 142, identifies any problems related to the managed object selection 141.

In step 202, the network management filtering process 140-2 produces a filter region 143 containing filter components 144. At least one of the filter components 144 is contingent upon the managed object selection 141, in conjunction with the view selection 142. Note that for different view selections, it may be the case that the same filter components are identified and displayed in the filter region. In other words, the filter components 144 displayed within the filter region 143 are dependant on the view selection 142 associated with that managed object selection 141 and the managed object selection 141.

In step 203, the network management filtering process 140-2 displays the filter region 143 containing the filter components 144. In an example configuration, the filter region 143 contains filter components 144 (some of which receive parameter values 149), a filter button 151, a clear button 153, an expanded data icon 152, a filter status region 146 containing a filter status 147, and a filter metric 148.

In step 204, the network management filtering process 140-2 identifies parameter values 149, from a user 108, that specify at least one filter component 144 in the filter region 143. In an example configuration, the parameter values 149 are initially default parameter values 149 (determined by the network management filtering process 140-2) prior to the user 108 changing those parameter values 149.

In step 205, the network management filtering process 140-2 applies the parameter values 149 to managed object data 145 associated with the managed object selection 141 to produce filtered results in the results region 150. The filtered results indicate resources in the storage area network 120 that match the parameter values 149.

In step 206, the network management filtering process 140-2 displays the filtered results 150, including filtered managed object data 145, in a results region 150 of the graphical user interface 160. The act of filtering the results changes the filter status region 146 (within the filter region 143) containing the filter status 147 and filter metric 148. The details of the filter status region 146, the filter status 147, and filter metric 148 will be further explained within the sub steps of 214 through 218.

Figure 6:
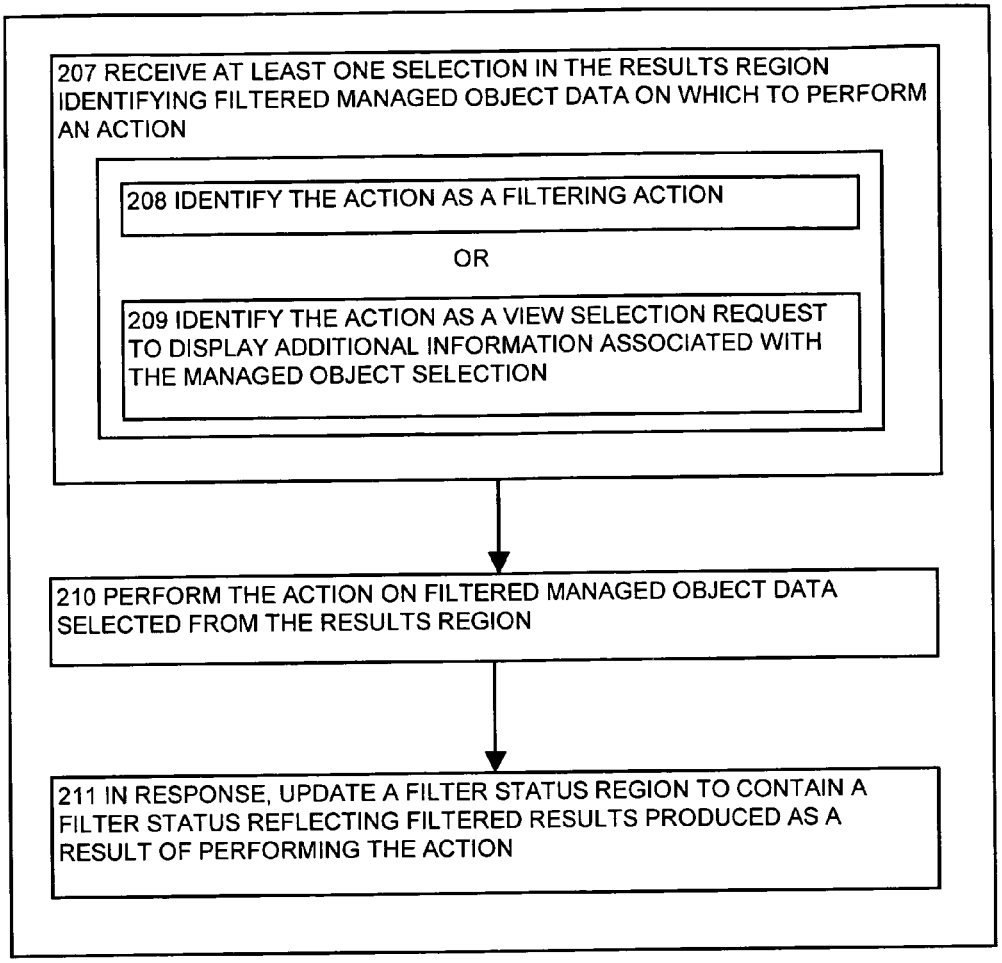
FIG. 6 illustrates a flowchart of a procedure performed by the system of FIG. 1 when the network management filtering process receives at least one selection in the results region identifying filtered managed object data on which to perform an action, according to one embodiment disclosed herein.

FIG. 6 is a flowchart of the steps performed by the network management filtering process 140-2 when it receives (e.g., from a user of a script driving the software) at least one selection in the results region 150 identifying filtered managed object data 145 on which to perform an action. In an example configuration, a user 108 can select one or more of the filtered managed object data 145, and perform additional actions on the filtered managed object data 145, such as displaying additional information related to the managed object selection 141.

In step 207, the network management filtering process 140-2 receives at least one selection in the results region 150 identifying filtered managed object data 145 on which to perform an action. In one example configuration, the managed object data 145 selected by the user 108 determines which possible actions are displayed to the user 108. That is, depending on the managed object data 145 selected by the user 108 (which could be one item within the results region 150 or even multiple items), the network management filtering process 140-2 displays actions that can potentially be performed on all the managed object data 145 selected by the user 108.

In step 208, the network management filtering process 140-2 identifies the action as a filtering action. The user 108 can perform additional filtering on previously filtered managed object data 145. For example, a user 108 can select all hosts to be displayed, then filter those hosts to display only those hosts that have a Windows based operating system. Then, a user 108 can filter those filtered results to display only those results that have task lists assigned to a particular user 108 or group of users 108.

Alternatively, in step 209, the network management filtering process 140-2 identifies the action as a view selection 142 request to display additional information associated with the managed object selection 141. For example, a user 108 can select filtered managed object data 145, choose an option called "List zones", that results in launching a dialog box to view further information concerning zones in the storage area network. This dialog is relevant to the information selected in the current view. The underlying view does not change in this example and the dialog appears over the top of that view.

In step 210, the network management filtering process 140-2 performs the action on filtered managed object data 145 selected from the results region 150. In an example configuration, a user 108 only chooses one filtered managed object data 145 on which to perform the action. In another example configuration, the user 108 chooses more than one filtered managed object data 145 on which to perform the action. In this scenario, the information that is displayed is associated with all the managed object data 145 chosen by the user 108.

In response to performing the action on the filtered managed object data 145 selected from the results region 150, in step 211, the network management filtering process 140-2 updates a filter status region 146 to contain a filter status 147 reflecting filtered results produced as a result of performing the action. The details of the filter status region 146, the filter status 147, and filter metric 148 will be further explained within the sub steps of 214 through 218.

Figure 7:
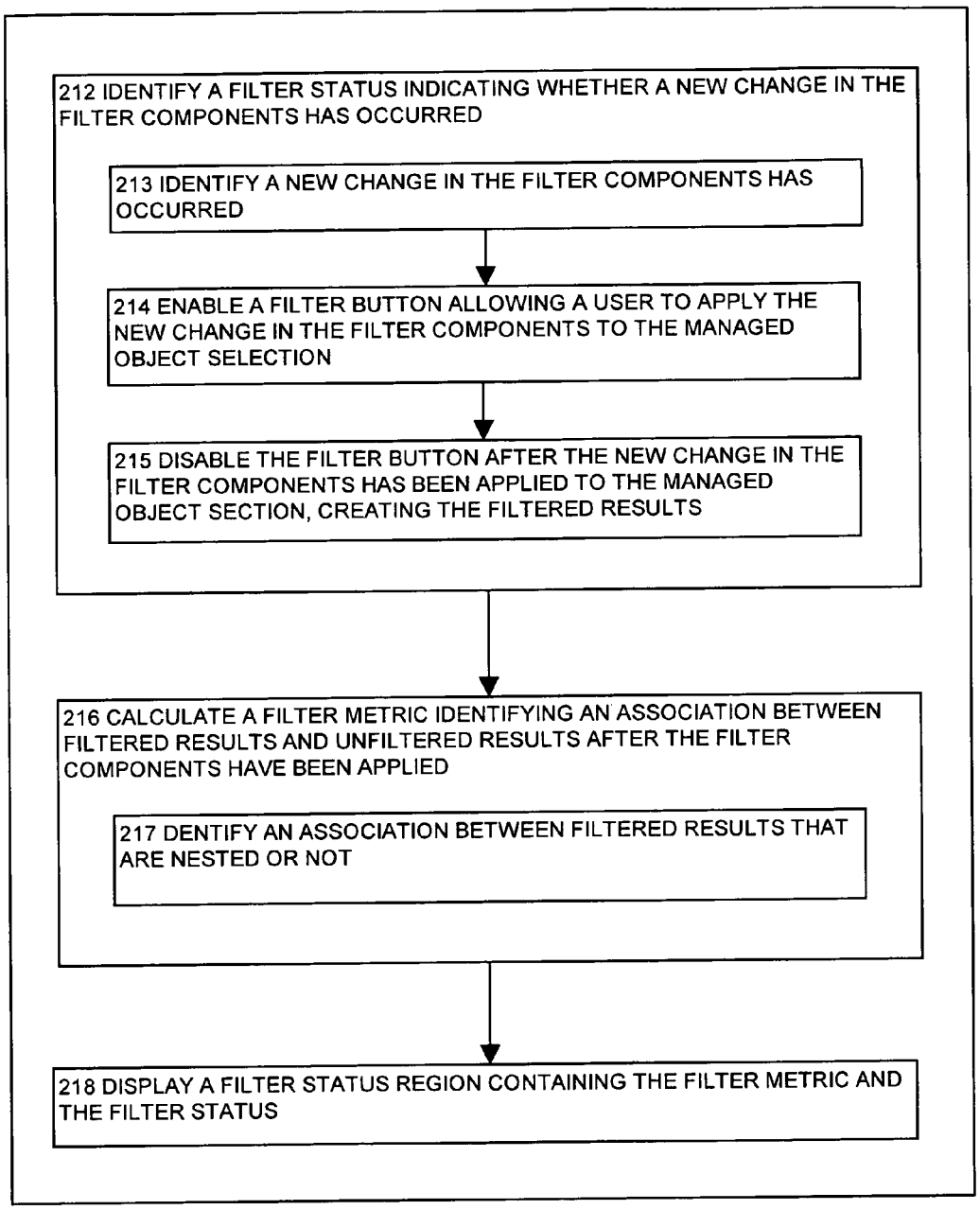
FIG. 7 illustrates a flowchart of a procedure performed by the system of FIG. 1 when the network management filtering process identifies a filter status indicating whether a new change in the filter components has occurred, according to one embodiment disclosed herein.

FIG. 7 is a flowchart of the steps performed by the network management filtering process 140-2 when it identifies a filter status 147 indicating whether a new change in the filter components 144 has occurred. The filter status region 146 contains a filter status 147 and a filter metric 148. Both the filter status 147 and the filter metric 148 reflect changes in the filter region 143 and the results region 150. Details of these changes will be discussed in the sub steps 213 through 218.

In step 212, the network management filtering process 140-2 identifies a filter status 147 indicating whether a new change in the filter components 144 has occurred. A change in the filter components 144 could be, for example, a user 108 filling a data field with one or more parameter values 149, a user 108 selecting an option from a drop down menu, or a user 108 selecting a time and date constraint from a calendar option. A user 108 wanting to filter results according to managed object data 145 could input into a data field, the names of one or more managed object data 145 associated with a managed object selection 141, such as "losan160" (in the case of one managed object data 145) or "losan160", "losao174" (in the case of more than one managed object data 145). Thus, the network management filtering process 140-2 would perform the filtering on both "losan160" and "losao174". A user 108 can employ the use of 'wildcards', meaning an entry of "loran*" indicates filtering the managed object data 145 to display only those managed object data 145 that are labeled as 'losan' with zero or more characters following the 'losan' label. For example, managed object data 145 labeled as 'losan', 'losan1', 'losanz', etc would all be displayed if a user 108 chose to filter the managed object data 145 to only display those matching 'losan*'.

In step 213, the network management filtering process 140-2 identifies a new change in the filter components 144 has occurred. When a user 108 makes a change to one of the filter components 144 (i.e., fills in a data field, makes a selection from a drop down menu or calendar option, etc), the network management filtering process 140-2 identifies this change has occurred. The network management filtering process 140-2 then updates the filter status 147 to indicate the managed object data 145 within the results region 150 has not been filtered using the constraints identified within the filter components 144, and instructs the user 108 to click on the filter button 151 to apply those constraints to the managed object data 145 within the results region 150.

In response, in step 214, the network management filtering process 140-2 enables a filter button 151 allowing a user 108 to apply the new change in the filter components 144 to the managed object selection 141. The filter button 151 was previously disabled prior to a user 108 making a change to one of the filter components 144.

In step 215, the network management filtering process 140-2 disables the filter button 151 after the new change in the filter components 144 has been applied to the managed object section 141, creating the filtered results. Once the user 108 has selected the filter button 151, the parameter values 149 contained within the filter components 144 are applied to the managed object data 145 associated with a managed object selection 141, and the network management filtering process 140-2 disables the filter button 151. The network management filtering process 140-2 also modifies the filter status 147 to indicate the managed object data 145 within the results region 150 has been filtered.

In step 216, the network management filtering process 140-2 calculates a filter metric 148 identifying an association between the filtered results and the unfiltered results after the filter components 144 have been applied. Generally, using this technique, the system determines if the filters applied are nested for a given view. If they are not nested, the system then calculates the total number of resources that would be seen if no filtering were applied to the view, as well the number of resources produced from a result of application of the filter.

In one embodiment, nested filters are provided in views that enable users to performed tiered filtering. By way of example, in a properties view, users are always filtering based solely on the filters shown in that view. Filtering by host name (losan*) and then by OS type (windows) in one step may be no different then filtering by host name, pressing filter, then filtering by OS type (leaving the host name filter set to losan*), and pressing filter again. In either case, the filter status will display the same results: 2 of 50 hosts (assuming there were 50 hosts returned in the unfiltered view, and 2 hosts met the criteria of being named losan* and being windows hosts). As an example of nested filters, if the user still selected the hosts folder in the tree, but went to the alerts folder, at first the filter status would say unfiltered. If the user then entered losan* in the "look in" field and then selected the state "critical" from one of the filter criteria in the alerts filter, the filter status would be calculated based on the number of alerts of status critical that apply to hosts named losan*. Note this filter status has nothing to do with whether or not the user filtered the hosts to losan* first and then filtered the alerts to critical. Note that only those views that enable users to filter and act on objects of a different type than the tree selection support nested filtering as described here. Examples of these views include alerts, schedule, tasks lists, and path details. In each case, the user can select hosts in the tree, but these views enable them to work with alerts, schedules, etc., not directly with hosts. For example, the filter metric 148 could identify "19 Tasks on 500 Hosts" indicating filtered results that identify nineteen tasks associated with five hundred Hosts.

In step 217, the network management filtering process 140-2 identifies an association between the filtered results that are nested or not. In other words, the filter metric could identify "3 of 19 Tasks on 500 Hosts" indicating filtered results that identify three tasks out of nineteen tasks associated with five hundred Hosts.

In step 218, the network management filtering process 140-2 displays a filter status region 146 containing the filter metric 148 and the filter status 147. The filter metric 148 changes (as previously described within sub step 217) upon application of the parameter values 149 within the filter components 144, to the managed object data 145 associated with managed object selection 141. The filter status 147 (as previously described within sub step 213) indicates, to a user 108, if any of the filter components 144 have changed, indicating those changes have not yet been applied to the managed object data 145 within the results region 150. The filter status 147 also notifies a user 108 when the modified filter components 144 have been applied to the managed object data 145 within the results region 150, creating filtered results.

Figure 8:
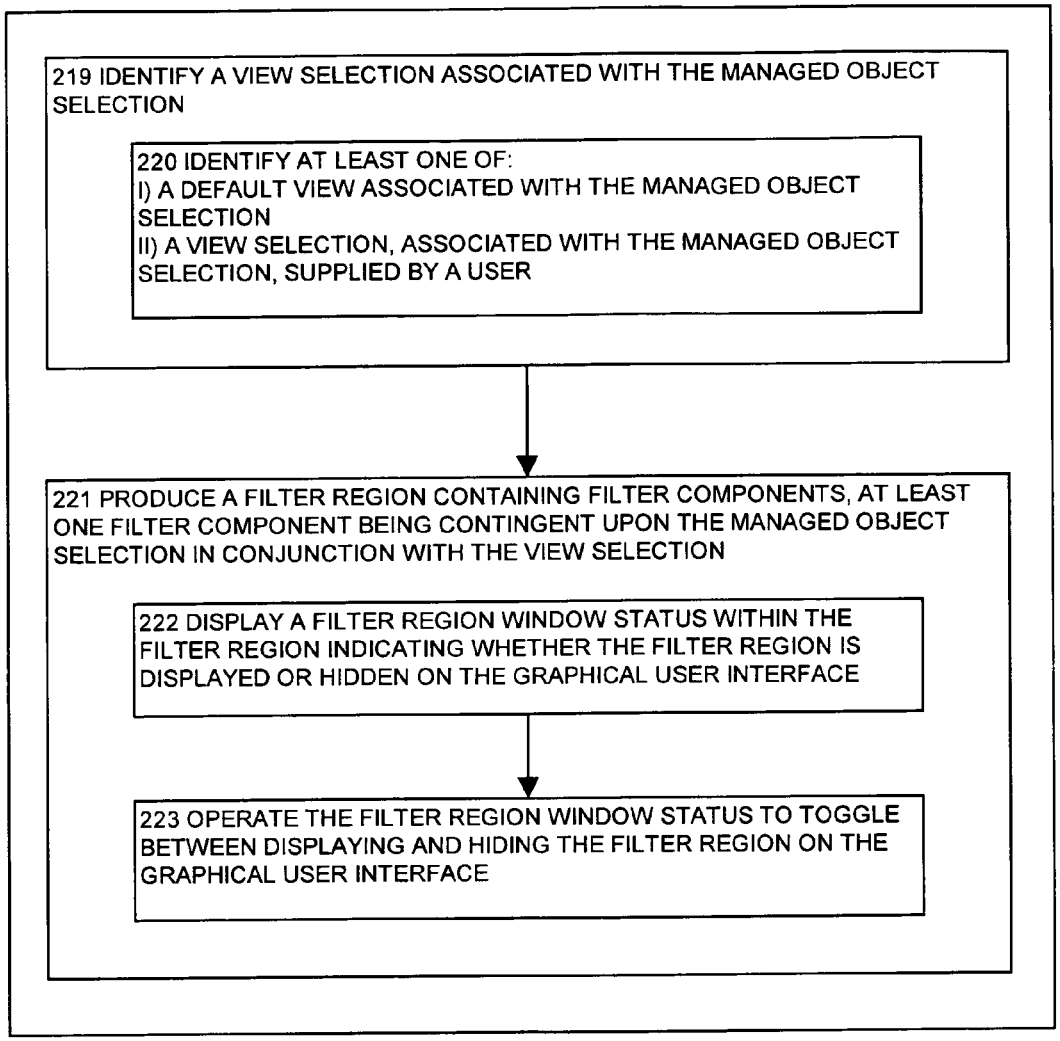
FIG. 8 illustrates a flowchart of a procedure performed by the system of FIG. 1 when the network management filtering process identifies a view selection associated with the managed object selection, according to one embodiment disclosed herein.

FIG. 8 is a flowchart of the steps performed by the network management filtering process 140-2 when it identifies a view selection 142 associated with the managed object selection 141, and produces a filter region 143 containing filter components 144. At least one of the filter components 144 is contingent upon the managed object selection 141, in conjunction with the view selection 142.

In step 219, the network management filtering process 140-2 identifies a view selection 142 associated with the managed object selection 141. In an example configuration, a user 108 selects a managed object selection 141, and the network management filtering process 140-2 determines a plurality of view selections 142 associated with the managed object selection. From that plurality of view selections 142, the network management filtering process 140-2 determines a default view selection 142 for the managed object selection 141.

In step 220, the network management filtering process 140-2 identifies at least one of 1) a default view selection 142 associated with the managed object selection 141, and 2) a view selection 142, associated with the managed object selection 141, supplied by a user 108. In other words, view selection 142 identified by the network management filtering process 140-2 is either the default view selection 142 (as determined by the network management filtering process 140-2), or a view selection 142 supplied by a user 108 (chosen from a plurality of view selections 142, determined by the network management filtering process 140-2, to be appropriate for the managed object selection 141).

In step 221, the network management filtering process 140-2 produces a filter region 143 containing filter components 144. At least one of the filter components 144 is contingent upon the managed object selection 141, in conjunction with the view selection 142.

In step 222, the network management filtering process 140-2 displays a filter region window status 154 within the filter region 143, indicating whether the filter region 143 is displayed or hidden on the graphical user interface 160. The filter region window status 154, depending on its appearance, indicates if the filter region 143 is displayed or hidden.

In step 223, the network management filtering process 140-2 operates the filter region window status 154 to toggle between displaying and hiding the filter region 143 on the graphical user interface 160. For example, if the filter region 143 is displayed, a user 108 can select the filter region window status 154, and the filter region 143 will collapse, displaying the filter region window status 154, modified to indicate the filter region 143 has been collapsed. If a user 108 clicks on the filter region window status 154 (when the filter region window status 154 is in a collapsed mode), the filter region 143 will reappear, and the filter region window status 154 will be modified to indicate the filter region window status 154 can be selected to collapse the filter region 143.

FIG. 9 is a flowchart of the steps performed by the network management filtering process 140-2 when it identifies parameter values 149 from a user 108 that specifies at least one filter component 144 in the filter region 143.

In step 224, the network management filtering process 140-2 identifies parameter values 149 from a user 108 that specifies at least one filter component 144 in the filter region 143. In an example configuration, the filter component 144 can include 1) a user 108 selected drop down menu associated with properties of the managed object selection 141 in conjunction with the view selection 142, 2) a data field representing managed object data 145 associated with the managed object selection 141 within the storage area network 120, to be filled in by a user 108, and 3) a clear button 153 operable to remove any managed object data 145 within the data field.

In step 225, the network management filtering process 140-2 identifies an expanded data icon 152 for use in conjunction with a data field (i.e., a parameter value 149 for a filter component 144 that is a data field to be filled in by a user 108).

In step 226, the network management filtering process 140-2 enables the expanded data icon 152. The enabled expanded data icon 152 indicates that the information contained with the data field has exceeded a character limit. The character limit represents a total number of characters the data field can contain.

In step 227, the network management filtering process 140-2 receives a selection of the expanded data icon 152 from a user 108. In other words, a user clicks on the expanded data icon 152.

In step 228, the network management filtering process 140-2 expands the data field to make visible to a user 108, the information contained with the data field associated with the expanded data icon 152. In other words, when a user 108 clicks on the expanded data icon 152, the data field associated with the expanded data icon 152 expands (for example by launching a dialog to show additional content) to make visible to the user all of the data contained within the data field, even if the data exceeds the limits of the data field.

In step 229, the network management filtering process 140-2 receives a parameter value 149, provided by a user 108, via a mouse.

In step 230, the network management filtering process 140-2 receives a parameter value 149, provided by a user 108, via a keyboard.

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

What is claimed is:

1. A computer-implemented method for filtering network management information in a graphical user interface in which at least one computer system accesses instructions from computer storage and executes the instructions to perform steps comprising:

receiving a selection of a tasks view tab displayed amongst multiple selectable tabs;

producing a filter region with a plurality of task filter components, the plurality of task filter components contingent on a selected Storage Area Network (SAN) object type chosen from a displayed listing of a plurality of SAN object types;

displaying the filter region while concurrently displaying the listing of the plurality of SAN object types and the multiple, selectable tabs;

receiving an identification of a user at one of the task filter components;

identifying at least one task associated with (i) a SAN object of the selected SAN object type and (ii) the user; and displaying a representation of the at least one task in a filtered results region while maintaining display of the filter region, the listing of the plurality of SAN managed objects and the multiple, selectable tabs;

wherein displaying the filter region comprises:
displaying at least one task control functionality that can be selected to control at least one task represented in the filtered results region;

wherein displaying the at least one task control functionality includes:
displaying a task execution functionality;
displaying a task stop functionality;
displaying a task retry functionality;
displaying a task schedule functionality; and
displaying a task rename functionality.

2. The computer-implemented method as in claim 1, comprising:

receiving a selection of an alerts view tab from the multiple selectable tabs while the representation of the at least one task is displayed in the filtered results region;

updating the filter region by replacing the plurality of task filter components with a plurality of alert filter components, the plurality of alert filter components contingent on the selected SAN object type; and terminating display of the representation of the at least one task in the filtered results region; and displaying the updated filtered region while maintaining display of the listing of the plurality of SAN object types and the multiple, selectable tabs.

3. The computer-implemented method as in claim 2, comprising:

receiving a selection of an alert state at one of the alert filter components;

identifying at least one SAN object that is (i) currently experiencing a selected alert state and (ii) of the selected SAN object type; and displaying a representation of the at least one identified SAN object in the filtered results region.

4. The computer-implemented method as in claim 3, wherein displaying the representation of the identified SAN object includes:

providing a message describing a problem with the identified SAN managed object;

providing a time at which the alert for the identified SAN managed object was created; and providing a name of the identified SAN managed object.

5. The computer-implemented method as in claim 3, wherein displaying the filter region comprises:

displaying a filter metric indicating (i) a total number of tasks associated with the selected SAN object type and (ii) a number of tasks that are associated with the selected SAN object type and the user; and wherein displaying the updated filtered region includes:
changing the filter metric to indicate a total number of alerts associated with the selected SAN object type.

6. The computer-implemented method as in claim 3, wherein displaying the updated filtered region includes:
terminating display of the at least one task control functionality.

7. The computer-implemented method as in claim 2, wherein producing a filter region with a plurality of task filter components includes:

producing each task filter component to receive at least one user-provided parameter for a variable task characteristic respect to at least one SAN object of the selected SAN object type.

8. The computer-implemented method as in claim 7, wherein updating the filter region includes:
producing each alert filter component to receive at least one user-provided parameter for a variable alert characteristic respect to at least one SAN object of the selected SAN object type.

9. The computer-implemented method as in claim 1, wherein displaying the representation of the at least one task in the filtered results region includes:
providing an identification of the task;
providing a status of the task;
providing an execution time of the task; and
providing a description of the task.

10. A computerized device comprising:
a memory;
a processor;
a communications interface;
an interconnection mechanism coupling the memory, the processor and the communications interface;
wherein the memory is encoded with a network management filtering application that when executed on the processor filters network management information in a graphical user interface on the computerized device by performing the operations of:
receiving a selection of a tasks view tab displayed amongst multiple selectable tabs;
producing a filter region with a plurality of task filter components, the plurality of task filter components contingent on a selected Storage Area Network (SAN) object type chosen from a displayed listing of a plurality of SAN object types;
displaying the filter region while concurrently displaying the listing of the plurality of SAN object types and the multiple, selectable tabs;
receiving an identification of a user at one of the task filter components;
identifying at least one task associated with (i) a SAN object of the selected SAN object type and (ii) the user; and
displaying a representation of the at least one task in a filtered results region while maintaining display of the filter region, the listing of the plurality of SAN managed objects and the multiple, selectable tabs;
wherein displaying the filter region comprises:
displaying at least one task control functionality that can be selected to control at least one task represented in the filtered results region;
wherein displaying the at least one task control functionality includes:
displaying a task execution functionality;
displaying a task stop functionality;
displaying a task retry functionality;
displaying a task schedule functionality; and
displaying a task rename functionality.

11. The computerized device as in claim 10, comprising:
receiving a selection of an alerts view tab from the multiple selectable tabs while the representation of the at least one task is displayed in the filtered results region;
updating the filter region by replacing the plurality of task filter components with a plurality of alert filter components, the plurality of alert filter components contingent on the selected SAN object type; and
terminating display of the representation of the at least one task in the filtered results region; and
displaying the updated filtered region while maintaining display of the listing of the plurality of SAN object types and the multiple, selectable tabs.

12. The computerized device as in claim 11, comprising:
receiving a selection of an alert state at one of the alert filter components;
identifying at least one SAN object that is (i) currently experiencing a selected alert state and (ii) of the selected SAN object type; and
displaying a representation of the at least one identified SAN object in the filtered results region.

13. The computerized device as in claim 12, wherein displaying the representation of the identified SAN object includes:
providing a message describing a problem with the identified SAN managed object;
providing a time at which the alert for the identified SAN managed object was created; and
providing a name of the identified SAN managed object.

14. The computerized device as in claim 12, wherein displaying the filter region comprises:
displaying a filter metric indicating (i) a total number of tasks associated with the selected SAN object type and (ii) a number of tasks that are associated with the selected SAN object type and the user; and
wherein displaying the updated filtered region includes:
changing the filter metric to indicate a total number of alerts associated with the selected SAN object type.

15. The computerized device as in claim 11, wherein displaying the updated filtered region includes: terminating display of the at least one task control functionality.

16. The computerized device as in claim 11, wherein producing a filter region with a plurality of task filter components includes:
producing each task filter component to receive at least one user-provided parameter for a variable task characteristic respect to at least one SAN object of the selected SAN object type.

17. The computerized device as in claim 16, wherein updating the filter region includes:
producing each alert filter component to receive at least one user-provided parameter for a variable alert characteristic respect to at least one SAN object of the selected SAN object type.

18. The computerized device as in claim 10, wherein displaying the representation of the at least one task in the filtered results region includes:
providing an identification of the task;
providing a status of the task;
providing an execution time of the task; and
providing a description of the task.

19. A computer readable storage medium comprising executable instructions encoded thereon operable on a computerized device, the instructions comprising:
instructions for receiving a selection of a tasks view tab displayed amongst multiple selectable tabs;
instructions for producing a filter region with a plurality of task filter components, the plurality of task filter components contingent on a selected Storage Area Network (SAN) object type chosen from a displayed listing of a plurality of SAN object types;
instructions for displaying the filter region while concurrently displaying the listing of the plurality of SAN object types and the multiple, selectable tabs;
instructions for receiving an identification of a user at one of the task filter components;
instructions for identifying at least one task associated with (i) a SAN object of the selected SAN object type and (ii) the user; and instructions for displaying a representation of the at least one task in a filtered results region while maintaining display of the filter region, the listing of the plurality of SAN managed objects and the multiple, selectable tabs;
wherein the instructions for displaying the filter region include:
instructions for displaying at least one task control functionality that can be selected to control at least one task represented in the filtered results region;

wherein displaying the at least one task control functionality includes:
displaying a task execution functionality;
displaying a task stop functionality;
displaying a task retry functionality;
displaying a task schedule functionality; and
displaying a task rename functionality.

* * * * *